Patented July 1, 1952

2,602,030

UNITED STATES PATENT OFFICE 2,602,030

FISH CANNING PROCESS AND COMPOSITION

Hercules D. Dakis, San Diego, Calif.

No Drawing. Application August 5, 1949, Serial No. 108,859

14 Claims. (Cl. 99—188)

This invention relates to the canning and packing of fish and more particularly to a process and composition useful in the canning and packing of fresh or cooked fish for human consumption.

In the canning of fish such as tuna fish for human consumption, it is customary to add to the can an oil mixed with the fish, which oil may be either soybean oil, cotton seed oil, olive oil or any other edible oil.

Generally, when the fish is opened for use, the user discards the oil and uses only the fish, with the consequent waste of the nutrient values in the oil. This discarding of the oil in which the fish is canned is largely due to the flavor picked up by the oil from the fish and the fishy smell imparted to the oil by the fish.

It is one object of this invention to provide an improved process and composition for the canning of fish in which the oil in which fish is packed is not subject to such waste.

It is another object of this invention to improve the taste and flavor of the oil in which the fish is canned and it is a further object of this invention to improve the flavor of the canned fish itself.

In the carrying out of the process of this invention, an oil is compounded to which it is desired to add a small quantity of a previously prepared citrus oil composition. The invention contemplates the use of lemon oil, bergamot oil, orange oil or lime oil and grapefruit oil interchangeably, each of which may be found to impart a characteristic flavor and aroma to the canned fish. However, it has been discovered that the use of such citrus oils alone imparts an undesirable bitterness to the fish and fish oil and further, such citrus oil does not remain well fixed in the primary canning oil. It has been discovered that these difficulties can be overcome by the preparation of a citrus oil additive to which is added a mixture of ordinary honey containing a small amount of gum mastic. This gum mastic is a vegetable gum secured from trees negative to certain Mediterranean areas and is well known for its retaining and holding properties.

In the preparation of the primary oil, it is found preferable to take a quantity of five hundred (500) gallons of lemon or other citrus oil, approximately two (2) ounces of powdered and ground gum mastic and five (5) pounds of natural honey. The gum mastic is added to the honey and mixed thoroughly therein and then the mixture is added to the five hundred (500) gallons of lemon oil and again thoroughly mixed to completely dissolve the honey and the gum mastic. This intimate mixing can be accomplished in many ways but a preferred method is to add to the five hundred (500) gallon drum of oil approximately one-half (½) pound of dry ice (solid carbon dioxide), which upon melting aerates and thoroughly mixes the mixture.

The oil thus prepared is added to the fish and ordinary fish oil at the time of canning in very small amounts, thus, for a seven (7) ounce can of tuna fish, approximately three (3) drops of the above described lemon oil preparation is sufficient and for a one (1) pound can, approximately seven (7) drops is recommended. It will be appreciated however, that an increase in the amount of the lemon oil preparation will serve to accentuate lemon flavor.

In the preparation of a primary orange, lime or grapefruit oil, the identical process above-described is repeated but in the preparation of a bergamot oil, it is recommended that seven (7) pounds of honey be utilized with two (2) ounces of the mastic gum, and due to the stronger flavor of the bergamot oil, a seven (7) ounce can of fish requires only two (2) drops of the bergamot oil mixture.

The fish thus packed in conventional oils, to which the citrus oil preparation has been added, can be finished either by the retort process or in any other conventional manner and upon opening for use will be found to have a delightful citrus oil flavor both in the oil in which the fish is canned and in the fish itself, which flavor is fixed and does not deteriorate upon standing of the canned fish, due to the preparation of the primary citrus oil as above-described. As a result, no significant limitation has been observed upon the shelf life of the thus prepared canned fish.

While there has been described a specific method of preparation of the primary orange oil additive and a specific method of treating the fish to be canned, it will be appreciated that the invention is not limited thereto, but comprehends the treatment of any citrus oil with vegetable gum and honey additives to reduce bitterness and achieve retaining and holding properties in the flavored oil.

What is claimed is:

1. A canning composition for use in the canning of fish comprising: citrus oil to which has been added natural honey containing a small amount of vegetable gum.

2. A canning composition for use in the canning of fish comprising: citrus oil to which has been added natural honey containing a small amount of a vegetable gum, in the proportions of approximately five hundred (500) gallons of citrus oil; five (5) pounds to seven (7) pounds honey and two (2) ounces vegetable gum.

3. A canning composition for use in the canning of fish comprising: lemon oil to which has been added natural honey containing a small amount of a vegetable gum.

4. A canning composition for use in the canning of fish comprising: lemon oil to which has been added natural honey containing a small amount of a vegetable gum, in the proportions of approximately five hundred (500) gallons citrus oil; five (5) pounds to seven (7) pounds honey and two (2) ounces vegetable gum.

5. A canning composition for use in the canning of fish comprising: orange oil to which has been added natural honey containing a small amount of a vegetable gum, in the proportions of approximately five hundred (500) gallons citrus oil; five (5) pounds to seven (7) pounds honey and two (2) ounces vegetable gum.

6. A canning composition for use in the canning of fish comprising: lime oil to which has been added natural honey containing a small amount of a vegetable gum, in the proportions of approximately five hundred (500) gallons citrus oil; five (5) pounds to seven (7) pounds honey and two (2) ounces vegetable gum.

7. A canning composition as set forth in claim 2 in which said vegetable gum is gum mastic.

8. The process of canning fish for human consumption to improve its taste and flavor which comprises: adding to the fish and oil, prior to sealing of the can, a small amount of a citrus oil containing honey and a vegetable gum.

9. The process of canning fish for human consumption to improve its taste and flavor which comprises: adding to the fish and oil, prior to sealing of the can, a small amount of a citrus oil containing honey and a vegetable gum, said ingredients being present in the ratios of approximately five hundred (500) gallons citrus oil; five (5) to seven (7) pounds honey and two (2) ounces of vegetable gum.

10. The process of canning fish for human consumption to improve its taste and flavor which comprises: adding to the fish and oil, prior to sealing of the can, a small amount of lemon oil containing honey and a vegetable gum.

11. The process of canning fish for human consumption to improve its taste and flavor which comprises: adding to the fish and oil, prior to sealing of the can, a small amount of lemon oil containing honey and a vegetable gum, said ingredients being present in the ratios of approximately five hundred (500) gallons citrus oil; five (5) to seven (7) pounds honey and two (2) ounces of vegetable gum.

12. The process of canning fish for human consumption to improve its taste and flavor which comprises: adding to the fish and oil, prior to sealing of the can, a small amount of orange oil containing honey and a vegetable gum, said ingredients being present in the ratios of approximately five hundred (500) gallons citrus oil; five (5) to seven (7) pounds honey and two (2) ounces of vegetable gum.

13. The process of canning fish for human consumption to improve its taste and flavor which comprises: adding to the fish and oil, prior to sealing of the can, a small amount of lime oil containing honey and a vegetable gum, said ingredients being present in the ratios of approximately five hundred (500) gallons citrus oil; five (5) to seven (7) pounds honey and two (2) ounces of vegetable gum.

14. The process set forth in claim 13 in which said vegetable gum is gum mastic.

HERCULES D. DAKIS.

REFERENCES CITED

The following references are of record in the file of this patent:

UNITED STATES PATENTS

| Number | Name | Date |
|---|---|---|
| 325,997 | Walkoff | Sept. 8, 1885 |
| 1,402,347 | Fritz-Williams | Jan. 3, 1922 |
| 1,694,680 | Burton et al. | Dec. 11, 1928 |
| 2,088,831 | Ash et al. | Aug. 3, 1937 |